United States Patent
Jainek

(10) Patent No.: US 6,893,561 B2
(45) Date of Patent: May 17, 2005

(54) LIQUID FILTER WITH A CAST METAL HOUSING AND METHOD OF PRODUCING THE SAME

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 232 days.

(21) Appl. No.: 10/291,804

(22) Filed: Nov. 12, 2002

(65) Prior Publication Data

US 2003/0089654 A1 May 15, 2003

Related U.S. Application Data

(63) Continuation of application No. PCT/EP01/04580, filed on Apr. 24, 2001.

(30) Foreign Application Priority Data

May 12, 2000 (DE) .......................................... 100 23 427

(51) Int. Cl.[7] .......................... B01D 27/08; B01D 35/30; B01D 35/31
(52) U.S. Cl. ....................... 210/232; 210/440; 210/450; 164/47; 164/131; 29/527.5; 148/549
(58) Field of Search ................................ 210/232, 440, 210/441, 450, DIG. 17; 164/47, 131; 29/527.5; 148/549

(56) References Cited

U.S. PATENT DOCUMENTS

| | | | |
|---|---|---|---|
| 2,568,181 A | * | 9/1951 | Zimmerman et al. ....... 210/435 |
| 3,358,839 A | | 12/1967 | Simon |
| 4,915,831 A | * | 4/1990 | Taylor .......................... 210/232 |
| 5,374,355 A | * | 12/1994 | Habiger et al. .............. 210/440 |
| 5,516,425 A | * | 5/1996 | Brieden et al. .............. 210/232 |
| 5,549,821 A | | 8/1996 | Bounnakhom et al. |
| 5,667,678 A | | 9/1997 | Dye et al. |
| 5,817,232 A | * | 10/1998 | Roll et al. ................... 210/130 |

FOREIGN PATENT DOCUMENTS

| | | | |
|---|---|---|---|
| DE | 4240656 | | 7/1993 |
| EP | 0657200 | | 6/1995 |
| WO | 98/13121 | * | 4/1998 |
| WO | 98/40147 | | 9/1998 |

OTHER PUBLICATIONS

Search Report.

* cited by examiner

Primary Examiner—Thomas M. Lithgow
(74) Attorney, Agent, or Firm—Crowell & Moring LLP

(57) ABSTRACT

A housing configuration for a liquid filter in which the housing is cup-shaped and is produced by a molding technique. The housing lid or lid is secured to the housing (10) by a course of threads (28) which can be produced without forming any undercuts. This is achieved inside an area (30) around the mold parting plane (29) by providing recesses (31) on the course of threads in the horizontal areas. As a result, the thread can be produced directly on the housing by the initial molding technique without any post-molding processing measures, so that manufacturing costs are reduced.

10 Claims, 3 Drawing Sheets

US 6,893,561 B2

LIQUID FILTER WITH A CAST METAL HOUSING AND METHOD OF PRODUCING THE SAME

CROSS REFERENCE TO RELATED APPLICATIONS

This application is a continuation of international patent application no. PCT/EP01/04580, filed Apr. 24, 2001 designating the United States of America and published in German as WO 01/85306, the entire disclosure of which is incorporated herein by reference. Priority is claimed based on Federal Republic of Germany patent application no. DE 100 23 427.5, filed May 12, 2000.

BACKGROUND OF THE INVENTION

The invention relates to a liquid filter with a lid, the housing of which is produced using a molding or casting forming technique, and to a method for producing such a liquid filter.

Liquid filters of the aforementioned type are usually configured with housing components that have a cylindrical basic structure. The lid can be screwed onto the housing by a screw thread. A liquid filter of this type is disclosed, for example, in published German patent application no. DE 196 37 008 A1. In this filter, the screw-on lid is provided with a radial groove into which an O-ring can be inserted to provide a seal relative to the housing component. The lid is screwed together with the housing component and is tightened with a defined torque. This prevents the lid from working itself loose during operation.

The described components, however, are costly to manufacture since the thread must be produced. At least in the housing component, which is typically made of metal, especially die-cast aluminum, the thread cannot be produced using an original casting technique without post-molding processing.

SUMMARY OF THE INVENTION

Thus, the object of the invention was to provide an improved liquid filter closure arrangement.

A further object if the invention is to provide a liquid filter with a closure between housing and lid that is cost-effective to produce and reliable in operation.

Another object of the invention was to provide a liquid filter with a threaded closure between housing and lid that can be produced solely by the original casting or molding without any post-molding processing.

It is also an object of the invention to provide a method of producing an improved liquid filter according to the invention.

In accordance with a first aspect of the invention, the objects are achieved by providing a liquid filter with a metal housing produced using an original casting forming technique and in which a filter cartridge is installed through which a liquid flows such that the filter cartridge separates a housing inlet from a housing outlet in a sealing manner, and with a lid which can be installed on and sealingly connected to the housing by rotating it relative thereto, wherein structures which form housing working surfaces are arranged on the housing such that the housing working surfaces communicate with working surfaces on the lid when the lid is installed on the housing, said structures which form housing working surfaces being oriented on the housing in such a way that the structures can be produced without an undercut relative to a removal direction of the housing from a mold in which the housing is cast, said mold having a parting line; wherein the communicating working surfaces of the housing and lid secure the lid to the housing; wherein the structures in the area of the parting line extend precisely in the removal direction from the mold, and wherein the working surfaces on the housing are produced solely by the original casting forming technique.

In another aspect of the invention, the objects are achieved by providing a method for producing a liquid filter as described above with a housing in which a filter cartridge through which a liquid flows is installed such that the filter cartridge separates a housing inlet from a housing outlet in a sealing manner, said housing being provided with a lid which is sealingly connected to the housing by rotating the lid relative thereto, said method comprising casting the housing with structures thereon having housing working surfaces which engage working surfaces on the lid to secure the lid in sealing connection to the housing, wherein said housing working surfaces are produced solely by said casting.

The liquid filter according to the invention comprises a housing that is produced using an initial casting or molding forming technique. As used herein, the term "housing" should be understood to include not only a separately configured component but also as a housing part that is integrated into another structure. This is the case, for instance, if the filter is used for the lubricating oil of an internal combustion engine, and the housing is integrated into the engine block. The housing can be sealed by a lid secured to the housing, and the connection between the lid and the housing should form a tight seal, so that the liquid to be filtered cannot escape from the housing. The connection between housing and lid is achieved by rotating the lid relative to the housing.

The liquid filter of the present invention is characterized in that mutually interacting working surfaces are provided on both the lid and the housing and thereby cause the lid to be secured to the housing. These working surfaces are formed by structures, which at least for the housing are configured without an undercut relative to the direction of removal of the formed parts of the housing from the mold in which they are formed. This makes it possible to produce the structures solely by the original casting, so that chip-producing machining steps can be eliminated. Post-casting processing, in particular, should also be avoided. This makes it possible to use an enormous savings potential in the production of the housing. The accumulation of chips can be completely prevented, so that the housing component does not have to be cleaned at the end. This achieves greater economic efficiency of the entire filter module. At the same time, the geometry of the structures can be freely designed within the limits of the requirement for an undercut-free production, so that the safety aspect can also be taken into account.

The working surfaces in the lid are arranged in such a way that they can communicate with or engage the working surfaces on the housing. If the working surfaces are arranged on the outside of the housing, those on the lid are arranged on the inside. If the structures forming the working surfaces are provided on the outside of the housing, this can be easily produced using two mold parts for the outside contour of the housing. These mold parts each form 180° of the housing circumference. In the area of the mold parting line, the structures must extend precisely in removal direction from the mold, i.e., perpendicularly to the center axis of the housing.

Another option is to flatten the area of the parting line to prevent undercuts in the case of thread-like structures. This also prevents the structures themselves, which do not extend up to the parting line, from having a seam that would impair proper functioning of the threads.

In accordance with one advantageous embodiment of the invention, an axially acting sealing element is used to provide a seal between the lid and the housing. This has the advantage that the effective area of the seal can likewise be located outside the seams that are associated with the production process of the housing. This enhances the sealing effect also if the housing component is produced without any post-processing. The sealing material must merely satisfy average requirements for deformability and sealing capacity.

To prevent liquid from leaking when the filter lid is screwed on during a filter change, a radially sealing liquid control ring may be used in addition to the actual sealing element between the lid and the housing. Particularly in filter cartridges that are installed at a sloping angle, this liquid control ring prevents liquid from running out during the time when the residual liquid in the housing can flow out through the liquid drain or outlet that is provided in the housing.

In accordance with a further embodiment of the invention, the structures that form the working surfaces may at least in part be configured perpendicularly to the removal direction of the lid. In a cylindrical housing, this simultaneously means a perpendicular orientation relative to the center axis of the housing. In this vertical area, the holding forces thus also act on the working surfaces between housing and lid perpendicularly to the removal direction. This effectively counteracts any unintended loosening of the lid. This is a significant advantage compared to conventional threaded connections, which can work themselves loose from the housing during operation of the filter through a process called pulsing open. This pulsing open is caused by a pulsating pressure pattern of the liquid to be filtered, which leads to alternating loading and relief of the lid connection.

A further embodiment of the invention provides that the working surfaces between the lid and the housing simultaneously form a limit stop which limits the installation movement of the lid. This assures a defined installation position of the lid. The limit stop prevents over-rotation of the lid, and if partially horizontal working surfaces are provided as described, it assures that the lid, once installed, remains within this area of the working surfaces.

Advantageously, the working surfaces can furthermore be provided with a locking or snap connection that locks between the installed lid and the housing. This provides feedback to the mechanic as he installs the lid so that he knows when the lid is properly installed. Furthermore, the snap connection can counteract any loosening of the lid by resisting the removal of the lid. When changing the filter, the mechanic must overcome this resistance. The locking connection can be realized, for instance, by forming the working surfaces with a zigzag profile, which engages when the lid is screwed on.

In accordance with a further embodiment of the invention, the structures forming the working surfaces ensure a forced guidance of the lid, which requires rotation through an angle greater than 180°. As a result, more time is required to remove the lid, so that the residual liquid remaining in the housing has enough time to drain off. This prevents the residual liquid from reaching the environment during a filter change. Furthermore, a largely liquid-free filter element can more easily be replaced by the mechanic. The configuration of the structures forming the working surfaces is advantageously thread-like. This forces the rotary motion to remove the lid. The structures of one part thus form gaps that resemble thread turns, in which the structures of the other part can move. After a defined rotation, the lid can be removed in the direction of the center axis of the housing.

One method for producing the described liquid filter provides that the working surfaces on the housing for producing the sealing connection of the lid be produced solely by the initial or original casting or molding forming technique. This achieves the aforementioned advantages.

According to another embodiment of the method, the working surfaces on the lid also can be solely produced using an initial or original casting or molding forming technique. In this case it is advantageous if the structures are arranged on the outside of the housing and are given a thread-like configuration. These structures are easy to manufacture since the mold parts can be readily removed toward the outside. The structures on the inside of the lid can be formed by short segments or knobs that can be readily produced using a core, which for removal is rotated through a predetermined angle. Thus, the lid can also be easily produced with a few different mold parts. As an alternative, a disintegrating core may be used, which can be incrementally removed from the injection-molded lid. Through geometric simplification, it is possible to manage with few core parts.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
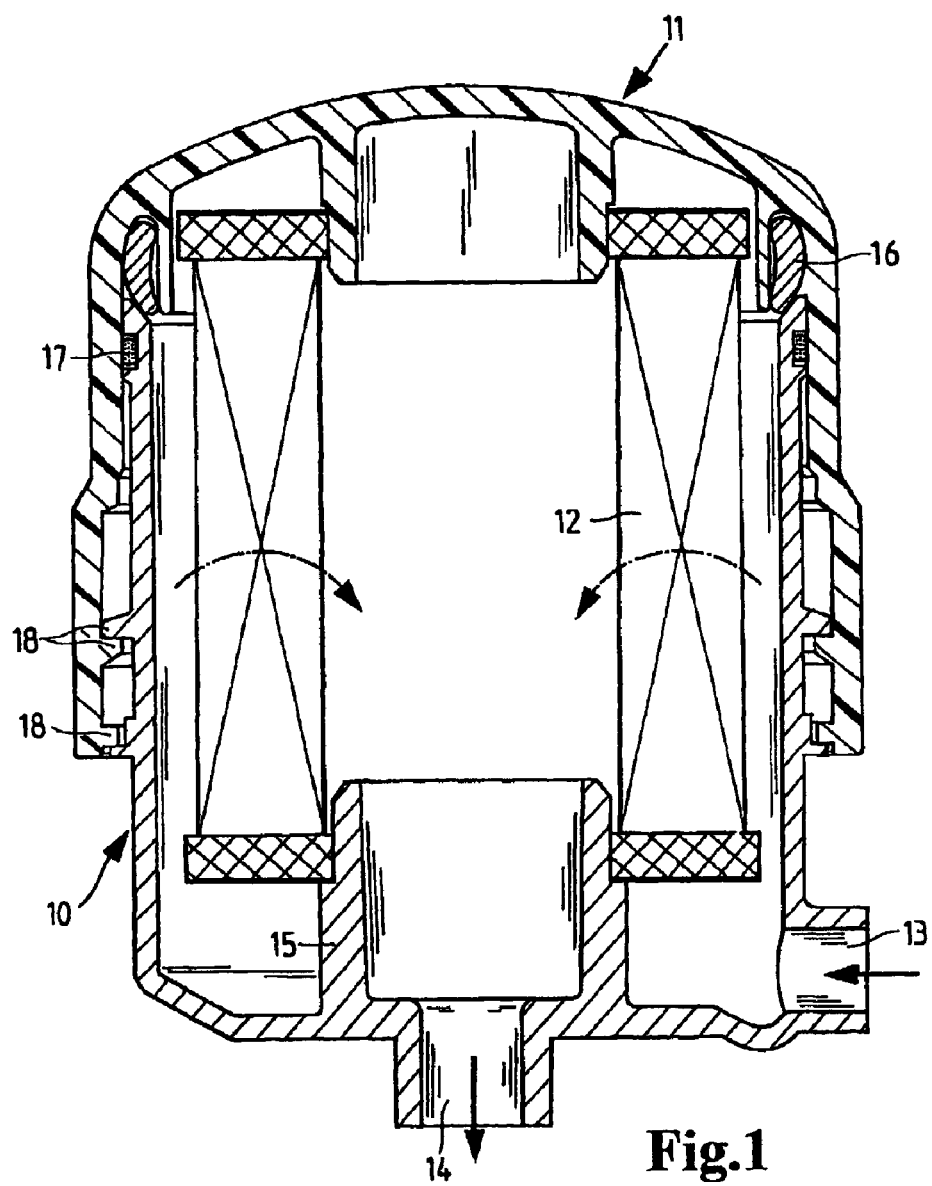
FIG. 1 is a cross sectional view through a liquid filter according to the invention with a screw-on lid.

FIG. 1 is a cross section through a liquid filter for the lubricating oil of an internal combustion engine. This filter comprises a housing 10, which is sealed by a lid 11. A filter cartridge 12 through which the oil flows from the outside toward the inside is installed in the housing. The flow of the liquid within the housing is indicated by arrows. The liquid flows from an inlet 13 through the filter cartridge to an outlet 14 configured as a connection piece 15 onto which the filter cartridge is placed.

The filter cartridge 12 is held and sealed by the screwed-on lid 11. An axially and radially effective seal 16 configured as a molded sealing element seals the lid relative to the housing. In addition, an O-ring is installed as an oil control ring 17 in the gap between housing 10 and lid 11. The lid is fixed to the housing by structures 18. These structures are formed on both the housing and the lid and have a thread-like configuration. These structures will now be described in greater detail with reference to the following detail drawing.

Figure 2:
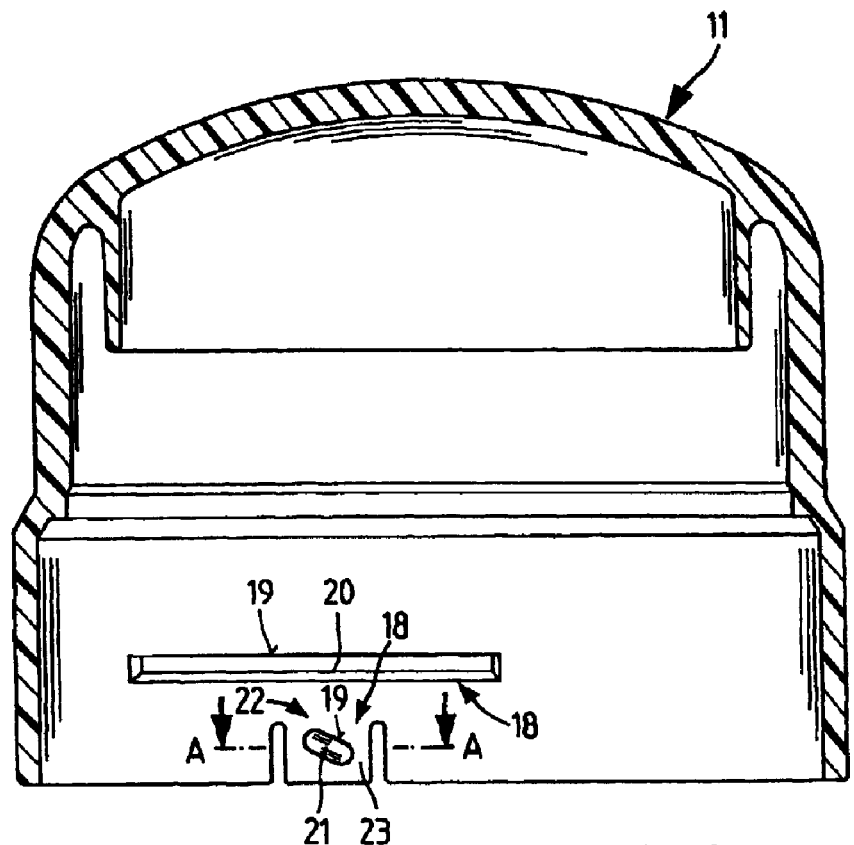
FIG. 2 is a cross section of the lid of the liquid filter of FIG. 1.

FIG. 2 shows the lid 11 according to FIG. 1 by itself. Structures 18 in lid 11 form working surfaces 19, which interact with the structures in the housing and thereby fix and reliably seal the lid on the housing. Structures 18 in the lid comprise a thread segment 20 and a snap projection 21. The snap projection and the thread segment form a gap 22 in which the structures of the housing extend, so that the thread segment 20 and the snap projection 21 ensure a fork-like guidance around structures 9 in the housing. The snap projection additionally has the purpose of producing a lock between lid 11 and housing 10 when the lid is installed.

Figure 3:
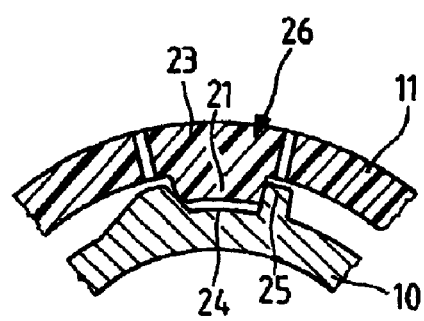
FIG. 3 is a sectional view taken along line 3—3 of FIG. 2.

FIG. 3 shows the section taken along line 3—3 in FIG. 2. The snap projection 21 is formed on a resilient tongue 23, which can elastically spring back when the snap projection locks into a recess 24 provided on housing 10. Recess 24 simultaneously forms a limit stop 25, which limits the rotational movement of lid 11 during installation. Recess 24 and snap projection 21 thus form a snap connection 26 in which limit stop 25 is integrated.

Figure 4:
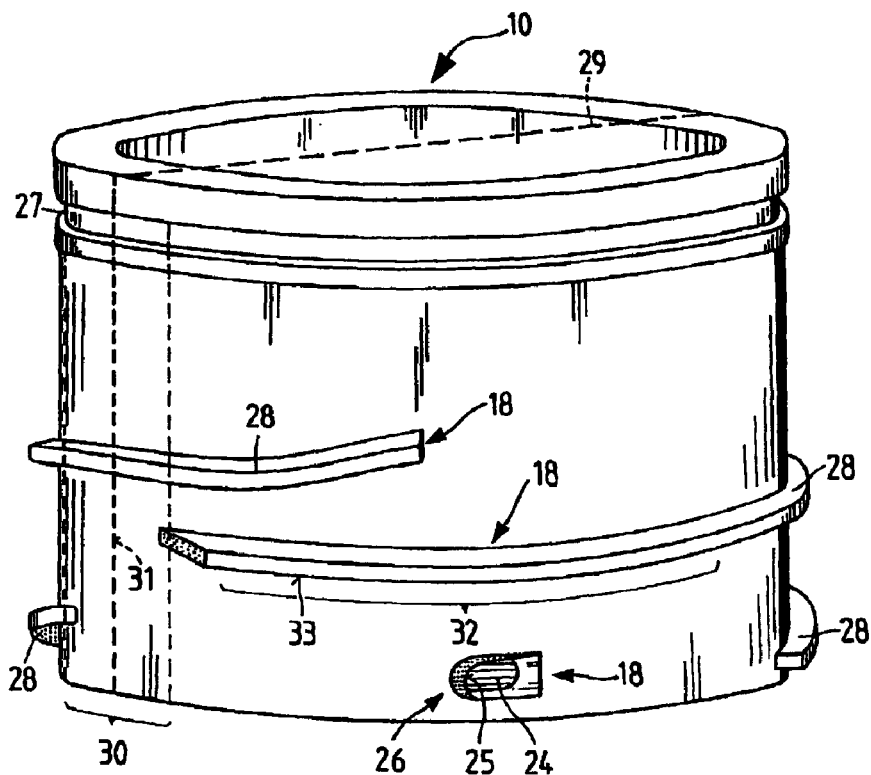
FIG. 4 is a perspective view of the upper part of the housing of FIG. 1.

FIG. 4 is a perspective view of the upper part of the housing. It shows a groove 27 for receiving the oil control ring 17 (not shown) and the previously described recess 24 with limit stop 25. Recess 24 together with a thread turn 28 forms the structures 18 on housing 10. To configure the thread turn without an undercut, a mold parting plane 29 must be taken into account. The two outer parts of the mold (not shown) are moved perpendicularly to the parting plane away from the cast housing. To avoid undercuts, the structures, at least in an area 30 that is adjacent to parting plane 29, must extend perpendicularly thereto. Such a horizontal course may be seen in the upper part of thread turn 28. In the lower part, a break 31 of thread turn 28 is provided, which merges into area 30 and thereby cuts out a portion of the thread.

Within an installation zone 32, the thread turn has an additional horizontal area, which is unimportant for an undercut-free production of the housing, but when the lid is installed interacts with the likewise horizontal thread segment 20. This occurs via an working surface 33 that communicates directly with the working surface 19 of the lid. The horizontal orientation of these working surfaces prevents the pressure acting on the lid from being converted into a loosening torque for the lid. This prevents the lid from pulsing open in the previously described manner due to the pulsating pressure loads. As a result, the holding force of the snap connection 26 is sufficient to reliably prevent the lid from working itself loose. In addition, the clamped seal 16, which is in contact with the housing and the lid, produces resistance against the loosening of the lid.

Figure 5:
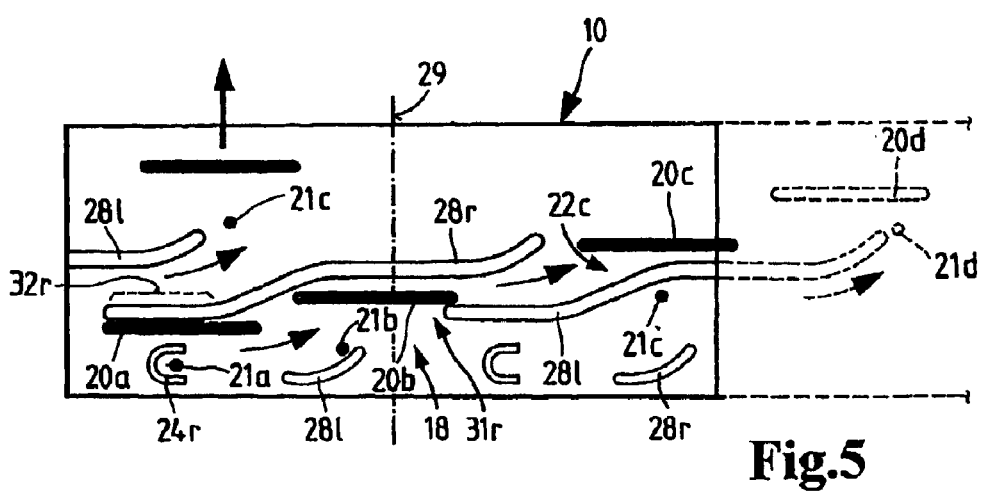
FIG. 5 is an enhanced detail view of the surface of the lateral housing area according to FIG. 4.

FIG. 5 illustrates the interaction of structures 18 in the lid (black) and the structure on the housing (white) in an enhanced detail view of the lateral area of housing 10. The mold parting plane 29, which is perpendicular to the enhanced detail view, is drawn as a reference. Thread section 20*a*–*d* and snap projection 21*a*–*d* are depicted in different positions during the removal of the lid. Arrows indicate the removal direction. To represent the removal process coherently, the enhanced detail view is expanded in one direction by broken lines. The structures depicted there correspond to those at the opposite end of the enhanced detail view. At the far left, the lid is shown in the installed state with thread segment 20*a* located in the installation zone 32*r* of thread turn 28*r*. The snap projection 21*a* is fixed within recess 24*r*.

By rotating the lid, the lid in position b is lifted from the axial seal. This occurs because snap projection 21*b* is forcibly guided at the beginning of thread turn 28*l*. This causes thread segment 20*b* to already be pushed into the gap between thread turns 28*r* and 28*l*. In this manner, the break 31*r* in thread turn 28*l* is bridged, so that the lid cannot slide back through this break into its installed position.

By rotating the lid further, the lid is further lifted as shown in position c. Clearly visible here, in particular, is the fork-like guidance of the lid by thread segment 20*c* and snap projection 21*c*, in the corresponding gap 22*c* of which thread turn 28*l* is forcibly guided. This forced guidance ends with the end of thread turn 28*l* in position d of the lid where snap projection 21*d* can be axially lifted at the end of thread turn 28*l*. The lid can thereby be removed from housing 10.

Thread turns 28*r* and 28*l* are identical and are arranged offset on the lid by 180°. Two thread segments and snap projections that are also offset by 180° are likewise provided on the lid. However, only one of the thread segments and snap projections is depicted in FIG. 5 to ensure better clarity. The thread segments and snap projections in positions a, b, c and d represent the same component, which is merely depicted in different removal positions.

The configuration of structures 18 according to FIG. 5 assures that the lid must complete an approximately 360° turn before it can be removed from the housing. The corresponding time required for the removal of the lid gives the residual lubricating oil inside the housing enough time to run out through an oil drain or outlet 14. As a result, the filter cartridge is largely free from oil residues after the lid has been opened, so that it can be removed without dripping. The described thread turn can also be multiply repeated in series. This results in a rotation angle greater than 360° until opening. The lid, however, becomes correspondingly longer.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid filter with a metal housing produced using an original casting forming technique and in which a filter cartridge is installed through which a liquid flows such that the filter cartridge separates a housing inlet from a housing outlet in a sealing manner, and with a lid which can be installed on and sealingly connected to the housing by rotating it relative thereto, wherein structures which form housing working surfaces are arranged on the housing such that the housing working surfaces communicate with working surfaces on the lid when the lid is installed on the housing, said structures which form housing working surfaces being oriented on the housing in such a way that the structures can be produced without an undercut relative to a removal direction of the housing from a mold in which the housing is cast, said mold having a parting line; wherein the communicating working surfaces of the housing and lid secure the lid to the housing; wherein the structures in the area of the parting line extend precisely in the removal direction from the mold, and wherein the working surfaces on the housing are produced solely by the original casting forming technique.

2. A liquid filter according to claim 1, further comprising a sealing element that acts at least partially in axial direction to form seal provided between the lid and the housing.

3. A liquid filter according to claim 1, further comprising a radially sealing liquid control ring provided between the housing and the lid.

4. A liquid filter according to claim 1, wherein the working surfaces in the area in which the structures that form the working surfaces are in contact when the lid is installed on the housing, are oriented at least partially perpendicular to the removal direction of the lid.

5. A liquid filter according to claim 1, wherein the structures that form the working surfaces are provided with a limit stop that limits the installation movement of the lid on the housing.

6. A liquid filter according to claim 1, wherein the structures that form the working surface are provided with a locking or snap connection that locks between the lid and the housing when the lid is installed.

7. A liquid filter according to claim 1, wherein the structures forming the working surfaces have a configuration which forms a forced guide for removing the lid from the housing, so that the lid must be rotated by an angle greater than 180° to be removed.

8. A liquid filter according to claim 7, wherein the working surfaces are formed by thread-like structures.

9. A method for producing a liquid filter according to claim 1, with a housing in which a filter cartridge through which a liquid flows is installed such that the filter cartridge separates a housing inlet from a housing outlet in a sealing manner, said housing being provided with a lid which is sealingly connected to the housing by rotating the lid relative thereto, said method comprising casting the housing with structures thereon having housing working surfaces which engage working surfaces on the lid to secure the lid in sealing connection to the housing, wherein said housing working surfaces are produced solely by said casting, said housing working surfaces being oriented on the housing in such a way that the housing is free of recesses relative to a removal direction of the housing from a mold in which the housing is cast, said mold having a parting line, and said working surfaces in the area of the parting line extending precisely in the removal direction from the mold.

10. A method according to claim 9, wherein the working surfaces on the lid for producing the sealing connection with the housing are produced solely by an original lid casting forming technique.

\* \* \* \* \*